Patented Nov. 11, 1924.

1,515,123

UNITED STATES PATENT OFFICE.

HERMAN KRUSE, OF JERSEY CITY, NEW JERSEY, ASSIGNOR TO PEERLESS INK CORPORATION, A CORPORATION OF NEW JERSEY.

INK.

No Drawing.    Application filed December 16, 1921.  Serial No. 522,883.

*To all whom it may concern:*

Be it known that I, HERMAN KRUSE, a citizen of the United States, residing at Jersey City, in the county of Hudson and State of New Jersey, have invented certain new and useful Improvements in Inks, of which the following is a specification.

My invention relates to improvements in inks, and more particularly to stencil ink, such as is used for duplicating and mimeographing.

In my improved ink, I prefer to employ a color base such as carbon, barium sulphate, or alumina hydrate, together with glycerine, and a saponified varnish for a consistency element, the latter being made up of water, soda, rosin, and oil, preferably and substantially as follows: ten pounds of water, one pound and a half of sal soda (sodium carbonate), twenty-four pounds of gum rosin, six pounds of kerosene oil, and fifty pounds of paraffin oil (No. 903 Swan & Finch). These ingredients for the consistency element or varnish may be heated in a steam jacketed kettle until all the water is evaporated.

A good quality of ink of the character described may be provided by mixing 8 parts by weight of carbon
2 parts by weight of malorie blue
20 parts by weight of glycerine
80 parts by weight of varnish (after evaporation of water).

If it is desired to use barium sulphate, instead of 8 parts by weight of carbon and 2 parts malorie blue, 40 parts by weight of barium sulphate may be substituted, or 20 parts by weight of alumina hydrate.

Without saponification, the ink may be made with the color base and glycerine by adding rosin and oil substantially as follows:

8 parts by weight of carbon
2 parts by weight malorie blue
20 parts by weight glycerine
24 parts by weight rosin
56 parts by weight mineral oil such as kerosene 6 parts to 50 parts of paraffin.

Of course it will be understood that various modifications may be made in the proportions and mixing of the ingredients without departing from the spirit of the invention as claimed.

I claim:

A stencil ink containing a color base, glycerine, and a saponified varnish.

In testimony whereof I hereunto affix my signature.

HERMAN KRUSE.